(12) United States Patent
Han et al.

(10) Patent No.: US 11,227,374 B2
(45) Date of Patent: Jan. 18, 2022

(54) METHOD AND APPARATUS FOR REALTIME OBJECT DETECTION IN UNMANNED AERIAL VEHICLE IMAGE

(71) Applicant: Kwangwoon University Industry-Academic Collaboration Foundation, Seoul (KR)

(72) Inventors: Seong Kyun Han, Seoul (KR); Ji Sang Yoo, Seoul (KR); Soon Chul Kwon, Seoul (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 144 days.

(21) Appl. No.: 16/711,894

(22) Filed: Dec. 12, 2019

(65) Prior Publication Data
US 2021/0166367 A1 Jun. 3, 2021

(30) Foreign Application Priority Data
Nov. 28, 2019 (KR) .......... 10-2019-0154978

(51) Int. Cl.
*G06T 7/00* (2017.01)
*G06T 11/60* (2006.01)
*B64C 39/02* (2006.01)

(52) U.S. Cl.
CPC .......... *G06T 7/0002* (2013.01); *B64C 39/024* (2013.01); *G06T 7/97* (2017.01); *G06T 11/60* (2013.01); *B64C 2201/123* (2013.01); *B64C 2201/127* (2013.01); *G06T 2207/20221* (2013.01)

(58) Field of Classification Search
CPC ......... G06T 7/0002; G06T 7/97; G06T 11/60; G06T 2207/20221; G06T 2207/10032; G06T 2207/30252; G06T 7/73; B64C 39/024; B64C 2201/127; B64C 2201/123
USPC ........................................... 382/103
See application file for complete search history.

(56) References Cited

U.S. PATENT DOCUMENTS

| 2008/0291269 | A1* | 11/2008 | Hong | H04N 13/354 348/51 |
| 2011/0141238 | A1* | 6/2011 | Tsukagoshi | H04N 13/156 348/46 |
| 2012/0219190 | A1* | 8/2012 | Kumagai | G06T 7/55 382/104 |
| 2012/0263372 | A1* | 10/2012 | Adachi | H04N 13/128 382/154 |
| 2014/0354674 | A1* | 12/2014 | Okamoto | H04N 9/3182 345/590 |
| 2017/0142409 | A1* | 5/2017 | Suzuki | G06T 11/60 |
| 2018/0278916 | A1* | 9/2018 | Kim | H04N 5/247 |
| 2018/0309962 | A1* | 10/2018 | Shimizu | B60R 1/00 |
| 2019/0004543 | A1* | 1/2019 | Kennedy | H04N 5/2171 |

(Continued)

*Primary Examiner* — Jerome Grant, II
(74) *Attorney, Agent, or Firm* — Dinsmore & Shohl LLP; Yongsok Choi, Esq.

(57) ABSTRACT

According to the present disclosure, an apparatus for real-time object detection in an image captured by an unmanned aerial vehicle (UAV) including an image splitter configured to receive an input image and split the input image into a left image and a right image; and an object detector configured to detect an object from each of the left image and the right image provided from the image splitter is provided.

14 Claims, 8 Drawing Sheets

(56) References Cited

U.S. PATENT DOCUMENTS

| | | | |
|---|---|---|---|
| 2019/0073902 A1* | 3/2019 | Indoh | G08G 1/04 |
| 2019/0138029 A1* | 5/2019 | Ryll | G05D 1/101 |
| 2019/0333252 A1* | 10/2019 | Maeda | G06T 3/4038 |
| 2019/0347496 A1* | 11/2019 | Takahashi | G06K 9/3241 |
| 2020/0191556 A1* | 6/2020 | Jia | G01C 5/00 |
| 2020/0244864 A1* | 7/2020 | Kida | H04N 5/2354 |
| 2020/0275024 A1* | 8/2020 | Yen | H04N 5/2254 |
| 2020/0302629 A1* | 9/2020 | Jie | G06N 3/0454 |
| 2021/0010236 A1* | 1/2021 | Nishi | E02F 9/2296 |
| 2021/0145273 A1* | 5/2021 | Lubatschowski | A61B 5/0066 |
| 2021/0165484 A1* | 6/2021 | Suguhara | G06F 3/013 |
| 2021/0174580 A1* | 6/2021 | Mundy | G06T 15/04 |
| 2021/0179087 A1* | 6/2021 | Tsujino | B60W 30/06 |
| 2021/0192756 A1* | 6/2021 | Huang | G06T 7/74 |

\* cited by examiner

METHOD AND APPARATUS FOR REALTIME OBJECT DETECTION IN UNMANNED AERIAL VEHICLE IMAGE

CROSS-REFERENCE TO RELATED APPLICATION(S)

This application claims the priority benefit of Korean Patent Application No. 10-2019-0154978 filed on Nov. 28, 2019, in the Korean Intellectual Property Office, the disclosure of which is incorporated herein by reference for all purposes.

BACKGROUND

1. Field

The present disclosure relate to a method and apparatus for real-time object detection in an unmanned aerial vehicle (UAV) image, and more particularly, to an algorithm, method, and apparatus for accurately and real time detecting an object such as a vehicle from an image captured in a UAV.

2. Description of the Related Art

Object detection algorithms in the field of image processing have been studied in various ways for use in various fields such as systems for detecting pedestrians on roads, cars, and intelligent robots capable of interacting with people.

In addition, with the development of communication technology, researches for processing massive amounts of information obtained from unmanned aerial vehicles (UAVs) and integrating the information into various systems have been actively conducted.

Typical application fields for the UAV include social safety systems, surveillance systems, military applications, and transportation systems, and are further expanding. In such application fields, object detection which infers the position and size of an object in an UAV image is very important as base information of the application system.

Recently, various methods of object detection in UAV images using convolution neural network based object detectors have been proposed. However, the existing methods using the convolution neural networks are operable only at low altitudes because they do not find small objects or cause a real-time problem because they use a model with a complex structure to improve accuracy.

Therefore, as a method for object detection in an UAV image, a new method for improving accuracy while including a lightweight convolution neural network based object detector is required.

SUMMARY

The present disclosure includes an apparatus and method for object detection configured to perform more accurate object detection at a small amount of computation using a lightweight convolution neural network of a non-complicated structure.

The present disclosure includes an apparatus and method for object detection using box merging according to split image processing (SIP) which improves the accuracy of an object detector.

The present disclosure includes an apparatus and method for object detection increasing the speed and accuracy of detecting an object such as a vehicle in a captured image of an unmanned aerial vehicle (UAV).

The problems of the present disclosure are not limited to the above-mentioned matters, and other technical problems that are not mentioned above will be clearly understood by those skilled in the art from the following description.

Additional aspects will be set forth in part in the description which follows and, in part, will be apparent from the description, or may be learned by practice of the presented embodiments.

According to an embodiment of the present disclosure, an apparatus for real-time object detection in an image captured by an unmanned aerial vehicle (UAV) an image splitter configured to receive an input image and split the input image into a left image and a right image; and an object detector configured to detect an object from each of the left image and the right image provided from the image splitter.

The image splitter may perform resize processing and normalization processing of the left image and the right image.

The left image and the right image may be configured to overlap at least partially at a center of the input image.

The apparatus may further include a box merging part configured to determine whether objects of the left image and the right image are the same object.

The box merging part may be configured to merge a box comprising an object from the left image and a box comprising an object from the right image when it is determined that the objects of the left image and the right image are the same object.

The box merging part may be configured to determine whether X coordinate values of the box comprising the object in the left image and the box comprising the object in the right image are included in an overlap region of the left image and the right image, and when it is determined that the X coordinate values are not included in the overlap region, exclude the boxes comprising the objects from a merging candidate target.

The box merging part may also be configured to receive a box-related coordinate value of the left image and a box-related coordinate value of the right image, determine whether Y coordinate values of the boxes of the left image and the right image are close within a previously determined reference, and determine the objects of the left image and the right image as different objects when it is determined that the Y coordinate values are not close within the previously determined reference.

The box merging part may also be configured to determine whether a center of X coordinate values of the box of the left image and the box of the right image is close within a previously determined reference when it is determined that the Y coordinate values are close within the previously determined reference, and determine the objects of the left image and the right image as the same object when it is determined that the center of the X coordinate values is close within the previously determined reference.

The box merging part may also be configured to determine whether an object size is smaller than or equal to a previously determined reference when it is determined that the center of the X coordinate values is not close within the previously determined reference, and determine the objects of the left image and the right image as different objects when it is determined that the object size is not greater than or equal to the previously determined reference.

The box merging part may also be configured to determine whether the box comprising the object in the left image and the box comprising the object in the right image are close to a cut plane when it is determined that the object size is greater than or equal to the previously determined reference, and determine the objects of the left image and the right image as the same object when it is determined that the two boxes are close to the cut plane.

According to another embodiment of the present disclosure, a method for real-time object detection in an image captured by an unmanned aerial vehicle (UAV) may include an image splitter splitting a received input image into a left image and a right image; and an object detector detecting an object from each of the left image and the right image.

The method may further include the image splitter performing resize processing and normalization processing of the left image and the right image.

The left image and the right image may be configured to overlap at least partially at a center of the input image.

The method may further include a box merging part determining whether objects of the left image and the right image are the same object.

The method may further include the box merging part merging a box comprising an object from the left image and a box comprising an object from the right image when it is determined that the objects of the left image and the right image are the same object.

The method may further include the box merging part determining whether X coordinate values of the box comprising the object in the left image and the box comprising the object in the right image are included in an overlap region of the left image and the right image, and when it is determined that the X coordinate values are not included in the overlap region, excluding the boxes comprising the objects from a merging candidate target.

The method may further include the box merging part receiving a box-related coordinate value of the left image and a box-related coordinate value of the right image, determining whether Y coordinate values of the boxes of the left image and the right image are close within a previously determined reference, and determining the objects of the left image and the right image as different objects when it is determined that the Y coordinate values are not close within the previously determined reference.

The method may further include the box merging part determining whether a center of X coordinate values of the box of the left image and the box of the right image is close within a previously determined reference when it is determined that the Y coordinate values are close within the previously determined reference, and determining the objects of the left image and the right image as the same object when it is determined that the center of the X coordinate values is close within the previously determined reference.

The method may further include the box merging part determining whether an object size is smaller than or equal to a previously determined reference when it is determined that the center of the X coordinate values is not close within the previously determined reference, and determining the objects of the left image and the right image as different objects when it is determined that the object size is not greater than or equal to the previously determined reference.

The method may further include the box merging part determining whether the box comprising the object in the left image and the box comprising the object in the right image are close to a cut plane when it is determined that the object size is greater than or equal to the previously determined reference, and determining the objects of the left image and the right image as the same object when it is determined that the two boxes are close to the cut plane.

According to another embodiment of the present disclosure, a computer-readable recording medium having embodied thereon a program for executing the method described above may be provided.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, the present disclosure will be described in detail by explaining embodiments of the disclosure with reference to the attached drawings. The present disclosure e may, however, be embodied in many different forms and should not be construed as being limited to the embodiments of the disclosure set forth herein. In the drawings, parts not related to the disclosure are not illustrated for clarity of explanation.

The terms used in the present description are merely used to describe particular embodiments of the disclosure, and are not intended to limit the scope of the present disclosure. The expression of singularity in the present specification may include the expression of plurality unless clearly specified otherwise in context.

In the present specification, it may be understood that the terms such as "including", "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, the components shown in the embodiments of the present disclosure are independently shown to represent different characteristic functions, and do not mean that each component includes separate hardware or one software component unit. That is, each component is described by listing each component for convenience of description, and at least two of the components may be combined into one component, or one component may be divided into a plurality of components to perform a function. The integrated and separated embodiments of each of these components are also included within the scope of the present disclosure without departing from the spirit of the disclosure.

The following embodiments are provided so that this disclosure will be thorough and complete, and will fully convey the concept of the disclosure to those skilled in the art. In the drawings, the thicknesses of layers and regions are exaggerated for clarity.

The present disclosure will now be described more fully with reference to the accompanying drawings, in which exemplary embodiments of the disclosure are shown.

Figure 1:
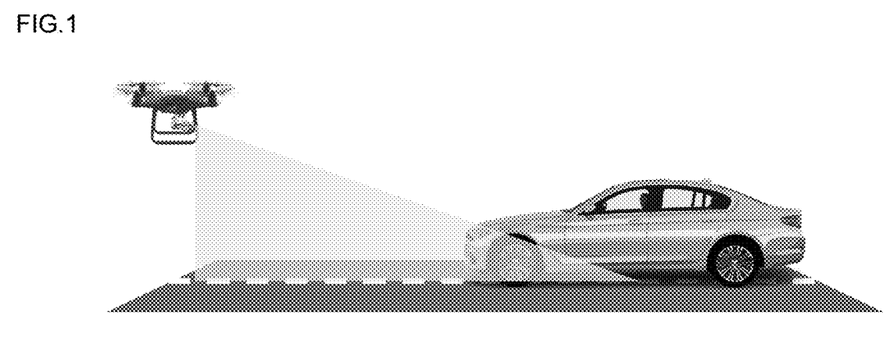
FIG. 1 is a schematic diagram of image acquisition of an unmanned aerial vehicle (UAV) according to an embodiment of the present disclosure.

FIG. 1 is a schematic diagram of image acquisition of an unmanned aerial vehicle (UAV) according to an embodiment of the present disclosure.

Referring to FIG. 1, an angle of a camera used in the UAV is, for example, about 20 degrees to 90 degrees on the ground. Capturing a moving image is possible at various altitudes. The capturing of an image may be performed using a built-in camera mounted on the UAV. For example, a 20M pixel CMOS sensor and an 8.8 mm/24 mm lens of 84 degree field of view (FOV) may be mounted, but the present disclosure is not limited to thereto. In addition, the captured image may be captured at a resolution of 720 P (1280×720 pixels) at 30 FPS or higher.

In addition, the altitude of the UAV may be located, for example, between 10 m and 50 m from the ground or between 5 m and 100 m from the ground. Object detection may use, for example, a previously recorded bird view image. A server may infer the position and size of an object. A method and apparatus for finding the object in the image captured by the UAV will be described below.

Figure 2:
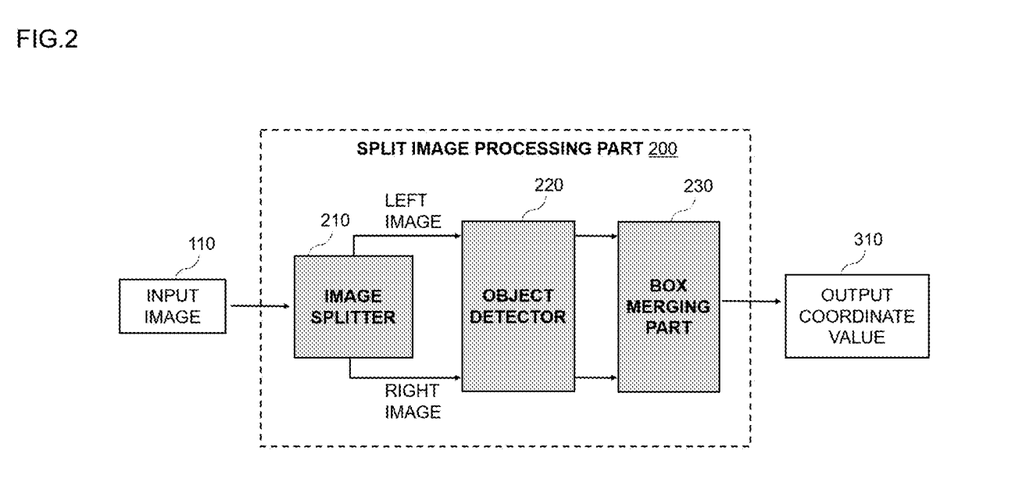
FIG. 2 is a block diagram illustrating a configuration of a split image processing (SIP) part according to an embodiment of the present disclosure.

FIG. 2 is a block diagram illustrating a configuration of a split image processing (SIP) part 200 according to an embodiment of the present disclosure.

Referring to FIG. 2, the SIP part 200 that performs SIP is configured to receive an input image 110 captured by an UAV, and output 310 a coordinate value finally processed via box merging through SIP and object detection.

The SIP part 200 is configured to execute various processes related to SIP, object detection, and merging of boxes including objects. For example, the SIP part 200 may include a central processing unit (CPU), an application processor (AP), and the like, and may include a memory therein capable of storing instructions or data related to at least one other component or communicate with a memory unit in an apparatus or, if necessary, an external memory to access necessary information.

According to an embodiment, the SIP part 200 may include an image splitter 210, an object detector 220, and a box merging part 230. These components may include a program or a program module that may be executed by one or more processors. The program or the program module included in the SIP part 200 may be configured in the form of an operating system, an application program, or a program, and may be physically stored on various types of storage devices that are widely used. Such a program or program module may include one or more routines, subroutines, programs, objects, components, instructions, data structures, and various forms for performing a specific task or executing a specific data type, but is not limited thereto.

First, the image splitter 210 receives the input image 110 and splits the image 110 into a left image and a right image. Here, the left image and the right image are configured to overlap at least a part at the center of the input image 110, and, for example, is configured to overlap 12.5%, or 10-15% or 5-20% at the center to generate an overlap region.

In addition, the image splitter 210 may be configured to perform resize processing and normalization processing of the left and right images. For example, when the resolution of the input image 110 is 720 P (1280×720 pixels), left and right two images of a 720×720 pixel size may be generated by splitting the input image 110 to overlap 160 pixels in the horizontal direction at the center. The separated left and right images are input to the object detector 220 through the resize processing and the normalization processing.

The object detector 220 is configured to detect an object from each of the left image and the right image provided from the image splitter 210, and may generate a bounding box of a rectangular shape in which each object is included therein based on the detection of each object.

The box merging part 230 may be configured to determine whether the object in each of the left image and the right image is the same object, and when it is determined that the object in each of the left image and the right image are the same object, perform a box merging process of merging a box including the object in the left image and a box including the object in the right image. That is, the box merging part 230 may determine whether the objects are the same using coordinates of boxes generated based on the object detection, and when it is determined that the objects are the same, output a final result through the box merging process of merging the boxes into one box.

The box merging part 230 first receives the coordinate values of the box in which the objects are detected in the left image and the right image, determines whether X coordinate values of the box including the object in the left image and the box including the object in the right image are included in the overlap region in which the left image and the right image overlap, and, when the X coordinate values do not overlap the overlap region, exclude the boxes from a merge candidate target.

The box merging part 230 may determine whether the center of the X coordinate values of the box in the left image and the box in the right image is close within a previously determined reference when the Y coordinate values of the two boxes are close within a previously determined reference based on the merge candidate target in which the X coordinate values of the boxes extend or are included in the overlap region, and when the center of the X coordinate values of the box is close within the previously determined reference, determine the object in each of the left image and the right image as the same object. At this time, two boxes may be combined into one box through box merging and related coordinate values may be output.

This is based on the fact that a difference in the Y coordinate values of both object boxes is not large when the same object is simultaneously detected in the left and right images in a region overlapped in a UAV image. More specifically, for example, by comparing the minimum Y value and the maximum Y value between the two boxes, when the difference therebetween all exceeds 20 pixels, the boxes may be determined as different objects, and when the difference is 20 pixels or less, the boxes may be determined as the same object. 20 pixels which is a previously determined Y coordinate closeness determination reference may differently change in some cases. In addition, when the Y coordinate value closeness condition is satisfied, it is determined whether the center of the X coordinate values of the two boxes are close within the previously determined reference by using the fact that the center points between the same objects are close. More specifically, for example, after obtaining the X coordinate center points of the two boxes, when a distance therebetween is less than 40 pixels, the boxes may be determined as the same object. A value of 40 pixels which is a previously determined X coordinate closeness determination reference may change in some cases.

In addition, the box merging part 230 may determine the identity of an object in consideration of the size of a box. A more specific box merging method will be described later with reference to FIG. 5.

Figure 3:
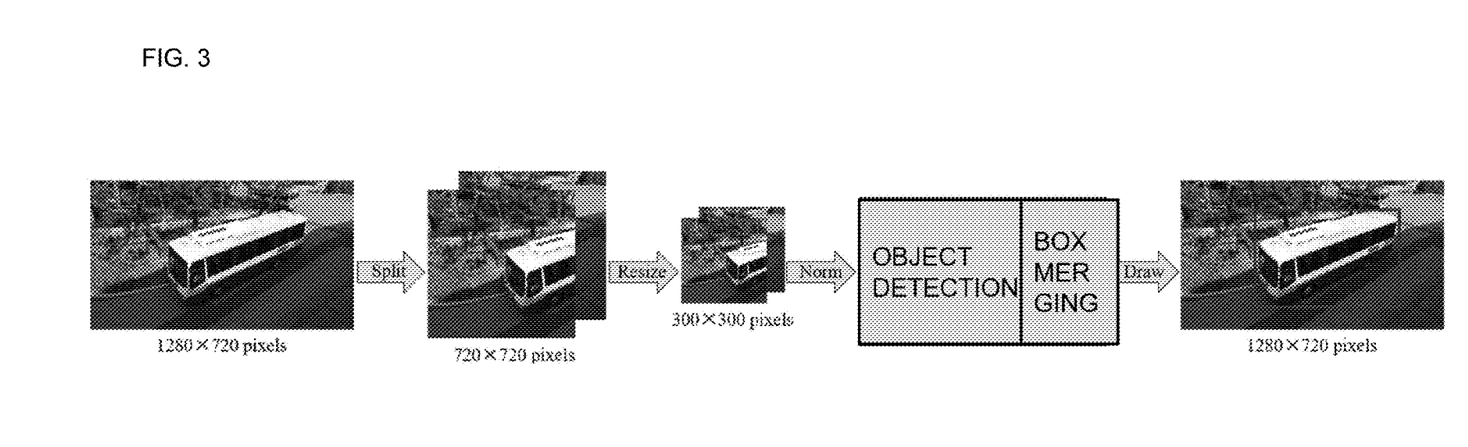
FIG. 3 is an example diagram for describing an object detection and box merging method according to an embodiment of the present disclosure.

FIG. 3 is an example diagram for describing an object detection and box merging method according to an embodiment of the present disclosure.

Referring to FIG. 3, unlike the object detection method of the related art, by applying SIP, an image including an object of 1280×720 pixels may be generated in the form in which some regions overlap as a left image and a right image of 720×720 pixels. The generated left image and the right image may change to an image of 300×300 pixels through resizing and may be input to the object detector 220 through normalization processing.

After object detection processing, the coordinate values of the two boxes including a bus detected as an object may be compared, for example, when the Y coordinate values are close and the center of the X coordinate values is close, it is determined that the objects of the two boxes are the same object, and through box merging processing of the two boxes, a final result of 1280×720 pixels may be output as shown in a right screen.

Figure 4:
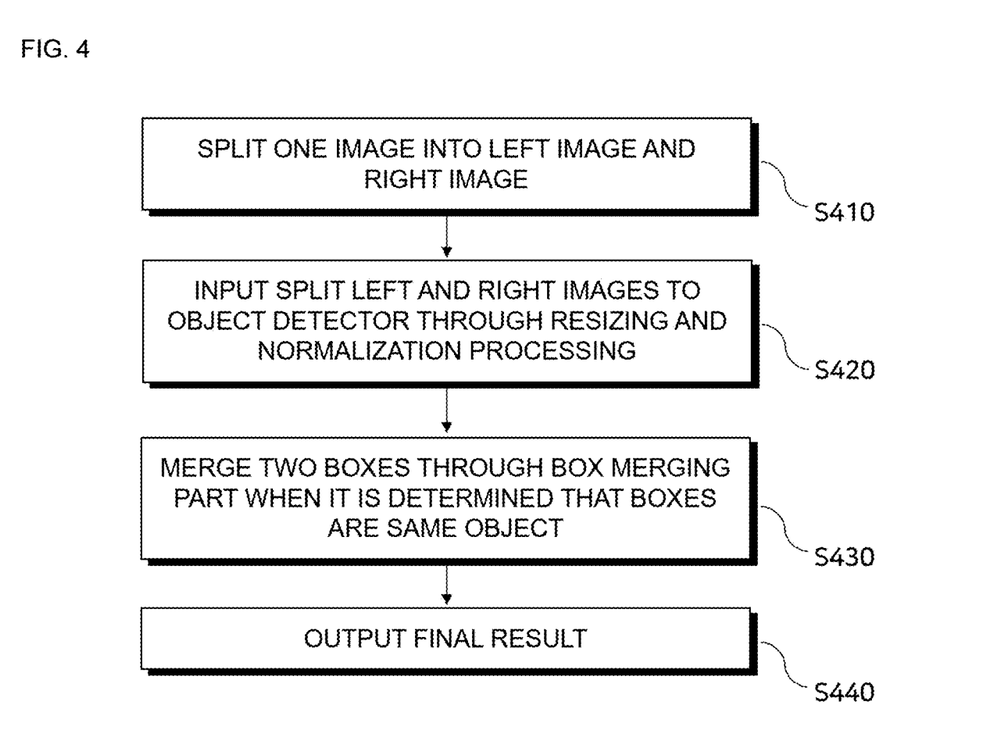
FIG. 4 is a flowchart illustrating a box merging method through SIP according to an embodiment of the present disclosure.

FIG. 4 is a flowchart illustrating a box merging method through SIP according to an embodiment of the present disclosure.

Referring to FIG. 4, one image of an input frame of an image captured by a UAV is split into a left image and a right image (S410).

The split left and right images are provided as inputs to the object detector 220 through size adjustment through resizing and normalization processing (S420).

A box including an object detected by the object detector 220 is generated, the coordinate values of the box generated in the left image and the right image are compared, and when it is determined that the boxes are the same object, the two boxes are merged through the box merging part 230 (S430).

A final result is output based on the coordinate values of the merged box (S440).

Figure 5:
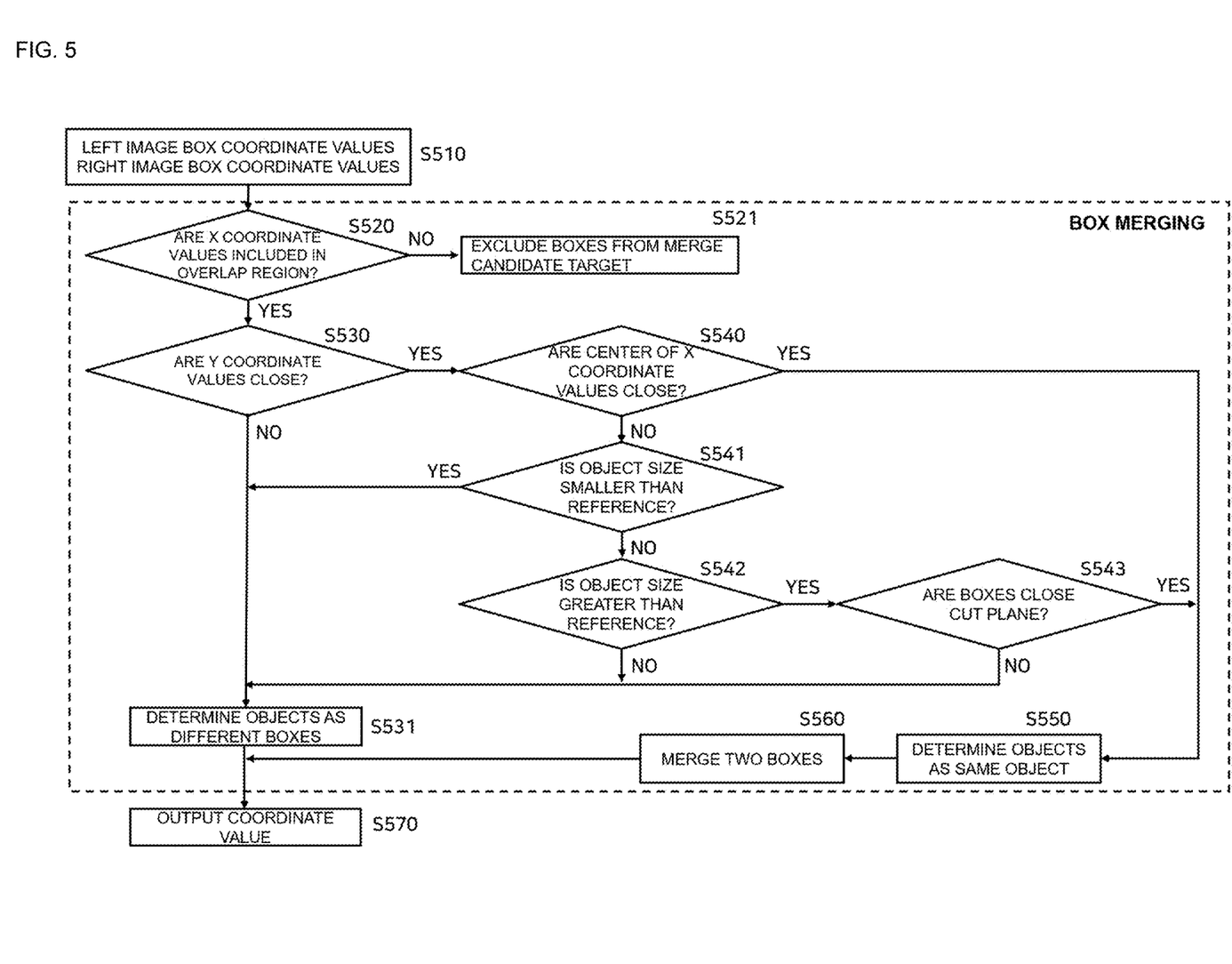
FIG. 5 is a flowchart illustrating a specific algorithm of box merging according to an embodiment of the present disclosure.

FIG. 5 is a flowchart illustrating a specific algorithm of box merging according to an embodiment of the present disclosure.

The box merging part 230 may receive the coordinate values of a box including an object detected in a left image and the coordinate values of a box including an object detected in a right image, which are information required for box merging, from the object detector 220 (S510).

The box merging part 230 first determines whether the X coordinate values of the box including the object in the left image and the box including the object in the right image are included in an overlap region where the left image and the right image overlap (S520). When the X coordinate values do not overlap in the overlap region, the box merging part 230 excludes the boxes from a merge candidate target (S521), when the X coordinate values extend or are included in the overlap region, include only the object box in the merging candidate target, and proceeds to the next step.

The box merging part 230 determines whether the Y coordinate values of the two boxes are close within a previously determined reference (S530). Here, when the Y coordinate values of the boxes in the left image and the right image are not close within the previously determined reference, the box merging part 230 may determine the object in each of the left image and the right image as a different object (S531). For example, the box merging part 230 may compare the minimum Y value and the maximum Y value between the two boxes, when a difference therebetween all exceeds 20 pixels, determine the boxes as different objects, and when the difference all is 20 pixels or less, determine the boxes as the same object.

Meanwhile, when the Y coordinate values are close within the previously determined reference, the box merging part 230 determines as a next step whether the center of the X coordinate values of the boxes in the left image and the right image is close within the previously determined reference (S540). After obtaining the center point of the two boxes, when a distance therebetween is less than 40 pixels, the box merging part 230 may determine the boxes as the same object, when the center of the X coordinate values is close within the previously determined reference, may determine the object in each of the left image and the right image as the same object (S550). At this time, the box merging part 230 may combine the two boxes into one box through box merging (S560), and output related coordinate values (S570).

When the center of the X coordinate values is not close within the previously determined reference, the box merging part 230 may determine whether the object size is smaller than or equal to a reference (S541). When the object size is, for example, smaller than 30×30 pixels, because there are many errors, the box merging part 230 may determine the boxes as different objects. This is a condition considering the characteristics of a UAV image of a small object size. When the object size is smaller than or equal to the reference, the box merging part 230 may determine the boxes as different objects, and when the object size is larger than the reference, the box merging part 230 may determine whether the object size is larger than or equal to the reference (S542).

Here, for example, when the size of the box is, for example, larger than 160×160 pixels, the maximum X coordinate of the box present in a left image range is in the range of 710 to 720 pixels, and the minimum X coordinate of the box present in a right image range is in the range of 560 to 570 pixels, the box merging part 230 may determine that the boxes are close to a cut plane (S543). Considering when the size of the object is very large, when the size of the object is larger than or equal to the reference, the box merging part 230 may determine the boxes as the same object when the center of the X coordinate values is close within the previously determined reference based on whether the boxes are close to the cut plane (S550).

Figure 6A:
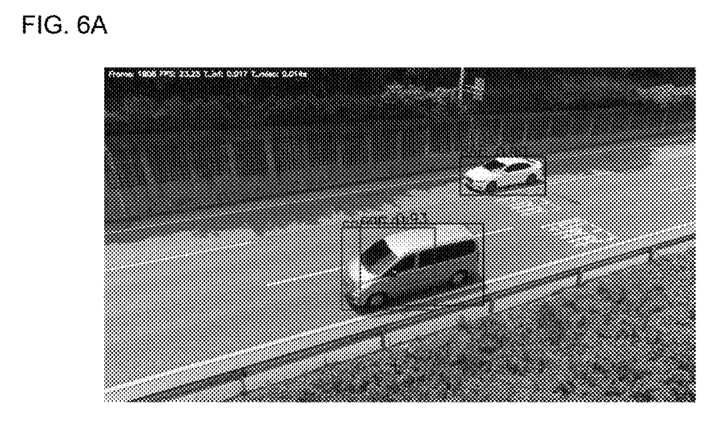
FIG. 6A is an example diagram for comparing appearances before and after box merging according to an embodiment of the present disclosure.
Figure 6B:
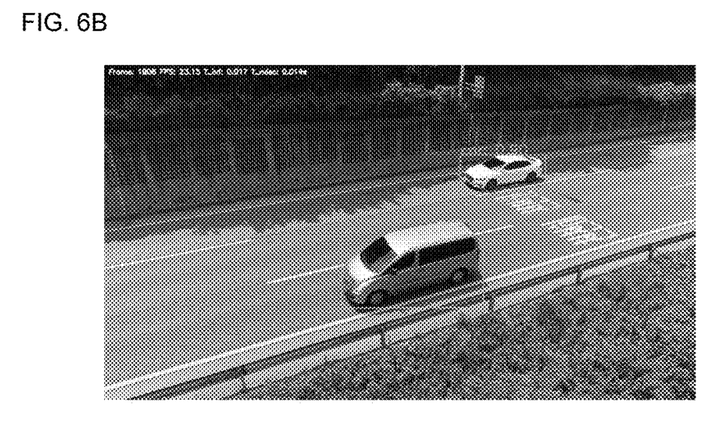
FIG. 6B is an example diagram for comparing appearances before and after box merging according to an embodiment of the present disclosure.

FIGS. 6A and 6B are example diagrams for comparing appearances before and after box merging according to an embodiment of the present disclosure.

FIG. 6A is a view before box merging through SIP. FIG. 6B is a view after box merging.

Referring to FIG. 6A, a box including a vehicle object in a left image and a box including a vehicle object in a right image are displayed. In FIG. 6A, when the object exists in an overlap region such as a vehicle located in the center, the boxes are cut or overlap. When the objects present in the overlap region are detected simultaneously in the left image and the right image according to splitting image, box merging may be performed as shown in FIG. 6B through the above-described SIP and box merging algorithm to combine the two boxes and display a detection result as one box.

Figure 7A:
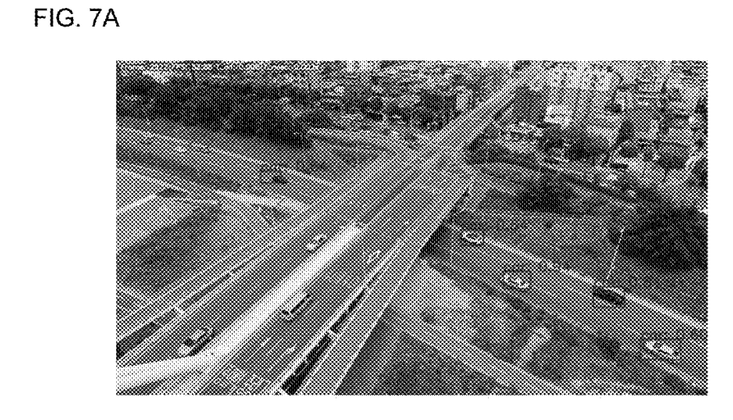
FIG. 7A is an example diagram for comparing object detection results before and after SIP according to an embodiment of the present disclosure.
Figure 7B:
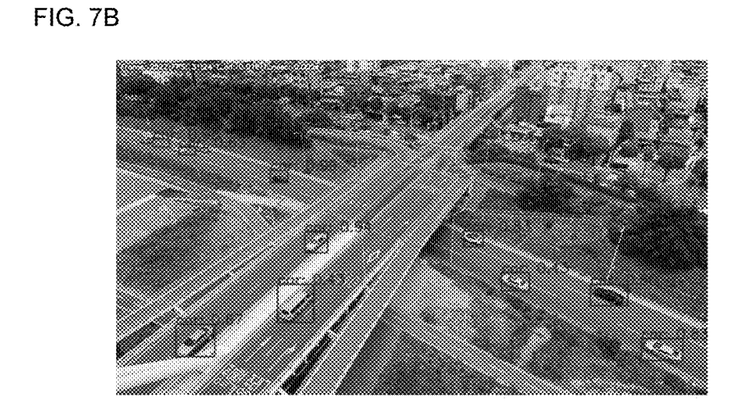
FIG. 7B is an example diagram for comparing object detection results before and after SIP according to an embodiment of the present disclosure.

FIGS. 7A and 7B are example diagrams for comparing object detection results before and after SIP according to an embodiment of the present disclosure.

With regard to the improved result of object detection based on the application of SIP according to the present disclosure, as shown in FIG. 7B which shows the object detection result after SIP and box merging compared to FIG. 7A which shows the object detection result before SIP, it may seen that more objects are accurately sensed and detected from a UAV image captured at a high altitude. In addition, it may be seen even when an amount of computation increases due to SIP that a vehicle operates at 33 FPS on the average and real-time object detection is possible.

Figure 8:
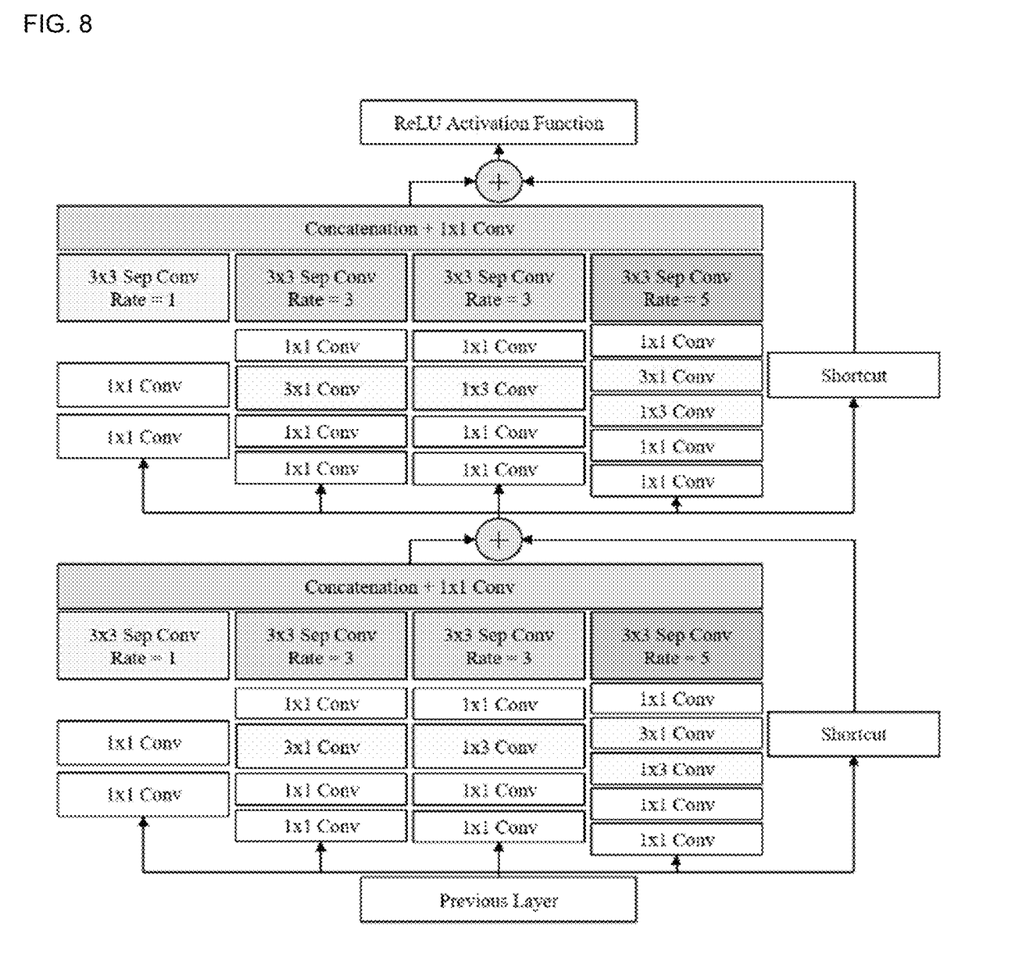
FIG. 8 is a diagram showing structure of the DRFB module of the object detector 220 according to an embodiment of the present disclosure.

FIG. 8 is a diagram showing structure of the DRFB module of the object detector 220 according to an embodiment of the present disclosure.

The proposed DRFB (Deeper Receptive Field Block) module was connected to feature maps for detecting small objects and consists of branches with variously sized RFs. The FIG. 8 shows the structure of our DRFB module. Each branch uses dilated convolution to generate good-quality feature maps using large RF. The module has a shortcut branch of ResNet and Inception-ResNet V2, and follows the multibranch structure of inception. This makes it possible to enhance the expressiveness of the feature maps and speed up model training while minimizing parameter increase.

The DRFB module used 1×1 convolution to increase nonlinearity and depth. This minimizes the amount of computation increases and improves the capacity of the structure. Instead of using 3×3 convolutions, 1×3 and 3×1 convolutions were used to reduce computational complexity with nonlinearity increments. The depth of the 5×5-dilated convolution branch was deeper than other branches. The SSD series object-detection model deduces the position, size, and label of multiple objects in a single-input image at once. Therefore, we used a deeper structure to increase the capacity of the large RF branch by adding nonlinearity in order to extract better features from objects that were scattered in the image. We also used a cascaded structure to enhance the expressiveness of the feature maps.

In each structure in FIG. 8, each layer in every branch includes batch normalization and ReLU activation after the convolution layer (Cony). However, a separable convolution (Sep Cony), shortcut and the concatenation layer did not include an activation function.

Figure 9:
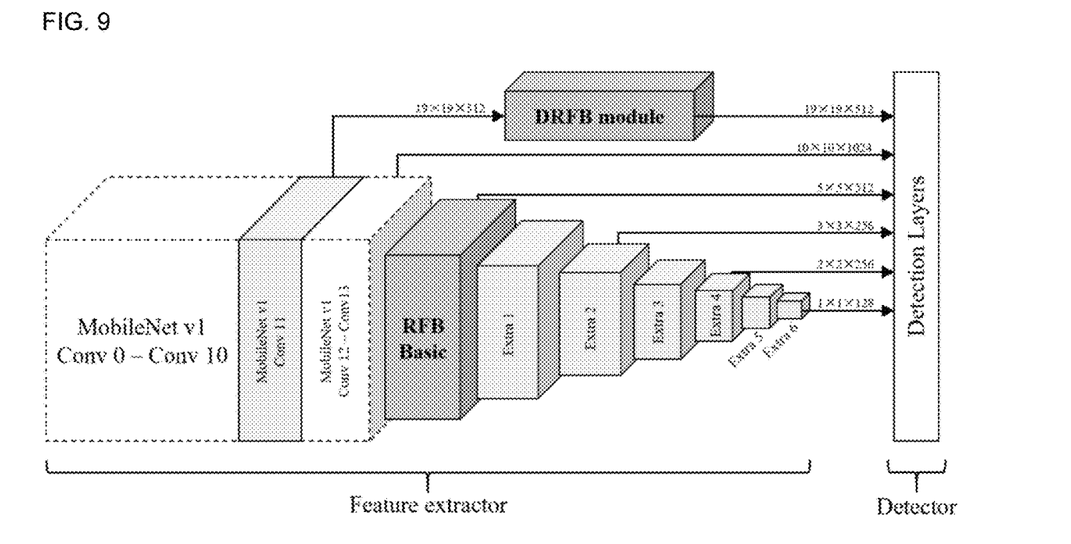
FIG. 9 is a diagram showing structure of the DRFBNet 300 of the object detector 220 according to an embodiment of the present disclosure

FIG. 9 is a diagram showing structure of the DRFBNet 300 of the object detector 220 according to an embodiment of the present disclosure.

The SSD object-detection model has various combined backbone versions. Among them, the MobileNet v1 backbone SSD300 uses depthwise convolution, which reduces the number of parameters and computational complexity, preserving its accuracy. However, the SSD object detector was trained to detect small-sized objects using feature maps from the front side of the feature extractor. Accordingly, feature maps for small-sized object detection have relatively low expressive power. Therefore, the SSD could quickly detect objects, but overall accuracy is low.

In the FIG. 9, the DRFB module-applied MobileNet v1 backbone SSD300 with RFB basic module is proposed and it is defined as DRFBNet300. For the backbone network, ImageNet pretrained MobileNet v1 can be used. All of the structures in FIG. 9 were identical to MobileNet v1 backbone SSD300 except the RFB basic and DRFB modules. The feature extractor consisted of the MobileNet v1 backbone, DRFB module, RFB basic module, and six additional convolution layers. The quality of the feature maps for small-object detection, 19×19×512 shapes, was enhanced through the DRFB module. The RFB basic module was connected to the front side of the extra layers. As a result, the expressiveness of the feature maps for large-object detection was enhanced, improving the overall accuracy of the detection model.

The various embodiments of the present disclosure may be implemented by hardware, middleware, microcode, software, and/or any combination thereof. For example, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, control parts, micro-control parts, microprocessors, or other electronic units designed to perform the functions described above, and/or a combination thereof.

In addition, for example, the various embodiments of the present disclosure may be recorded or encoded in computer-readable media including commands. The commands recorded or encoded in the computer-readable media allow a programmable processor or another processor to perform methods when they are implemented. The computer-readable media include computer storage media, and communication media having arbitrary media easily transferring computer programs from one place to another place. The storage media may be arbitrary available media accessible by computers. For example, the computer-readable media include random access memory (RAM), read-only memory (ROM), electrically erasable programmable read-only memory (EEPROM), compact disk read-only memory (CD-ROM) or other optical disk storage medium, magnetic disk storage medium or other magnetic storage device, or an arbitrary medium used to restore or store desired program codes to the form of commands or data structures accessible by computers.

The hardware, software, firmware and so on are implemented in the same device or individual devices to support the various operations and functions described in the present disclosure. Additionally, the units, modules, components as described by the term 'parts' of the present disclosure may be individually formed as interoperable logic devices. The description on the different characteristics of the modules, units and the like is intended to emphasize the different functional embodiments of the present disclosure, and it does not mean that they should be operated by the individual hardware or software components. On the contrary, the functions related to one or more modules or units are performed by the individual hardware or software components or may be integrated by the common or individual hardware or software components.

According to the present disclosure, an apparatus and method for object detection configured to perform more accurate object detection at a small amount of computation using a lightweight convolution neural network of a non-complicated structure may be provided.

In addition, according to the present disclosure, an apparatus and method for object detection using box merging according to SIP which improves the accuracy of an object detector may be provided.

In addition, according to the present disclosure, an apparatus and method for object detection increasing the speed and accuracy of detecting an object such as a vehicle in a captured image of an UAV may be provided.

The effects of the present disclosure are not limited to the above-mentioned matters, and other technical effects that are not mentioned above will be clearly understood by those skilled in the art from the following description.

The operations are indicated in the drawings in specific steps, but it should be understood that the illustrated specific steps, the sequential steps, or all the specific steps are not necessarily carried out so as to accomplish desired results. In arbitrary environments, multitasking and parallel processing are more advantageous. Furthermore, it should be understood that the classification of the various components is not needed for all the embodiments of the present disclosure and that the described components are integrated as a single software product or packaged as a plurality of software products.

As mentioned above, the embodiment of the present disclosure has been disclosed in the specification and drawings. In the description of the present disclosure, special terms are used not to limit the present disclosure and the scope of the present disclosure as defined in claims, but just to explain the present disclosure. Therefore, persons skilled in the relevant art can appreciate that many modifications and variations are possible in light of the above teachings. It is therefore intended that the scope of the disclosure be limited not by this detailed description, but rather by the claims appended hereto.

What is claimed is:

1. An apparatus for real-time object detection in an image captured by an unmanned aerial vehicle (UAV), the apparatus comprising:
    an image splitter configured to receive an input image and split the input image into a left image and a right image;
    an object detector configured to detect an object from each of the left image and the right image provided from the image splitter; and
    a box merging part configured to determine whether objects of the left image and the right image are the same object,
    wherein the box merging part is configured to merge a box comprising an object from the left image and a box comprising an object from the right image when it is determined that the objects of the left image and the right image are the same object, and
    wherein the box merging part is configured to determine whether X coordinate values of the box comprising the object in the left image and the box comprising the object in the right image are included in an overlap region of the left image and the right image, and when it is determined that the X coordinate values are not included in the overlap region, exclude the boxes comprising the objects from a merging candidate target.

2. The apparatus of claim 1, wherein the image splitter performs resize processing and normalization processing of the left image and the right image.

3. The apparatus of claim 1, wherein the left image and the right image are at least partially overlapped with each other at a center of the input image.

4. The apparatus of claim 1, wherein the box merging part is further configured to receive a box-related coordinate value of the left image and a box-related coordinate value of the right image, determine whether Y coordinate values of the boxes of the left image and the right image are close within a previously determined reference, and determine the objects of the left image and the right image as different objects when it is determined that the Y coordinate values are not close within the previously determined reference.

5. The apparatus of claim 4, wherein the box merging part is further configured to determine whether a center of X coordinate values of the box of the left image and the box of the right image is close within a previously determined reference when it is determined that the Y coordinate values are close within the previously determined reference, and determine the objects of the left image and the right image as the same object when it is determined that the center of the X coordinate values is close within the previously determined reference.

6. The apparatus of claim 4, wherein the box merging part is further configured to determine whether an object size is smaller than or equal to a previously determined reference when it is determined that the center of the X coordinate values is not close within the previously determined reference, and determine the objects of the left image and the right image as different objects when it is determined that the object size is not greater than or equal to the previously determined reference.

7. The apparatus of claim 6, wherein the box merging part is further configured to determine whether the box comprising the object in the left image and the box comprising the object in the right image are close to a cut plane when it is determined that the object size is greater than or equal to the previously determined reference, and determine the objects of the left image and the right image as the same object when it is determined that the two boxes are close to the cut plane.

8. A method for real-time object detection in an image captured by an unmanned aerial vehicle (UAV), the method comprising:
    splitting, by an image splitter, a received input image into a left image and a right image;
    detecting, by an object detector, an object from each of the left image and the right image;
    determining, by a box merging part, whether objects of the left image and the right image are the same object;
    merging, by the box merging part, a box comprising an object from the left image and a box comprising an object from the right image when it is determined that the objects of the left image and the right image are the same object; and
    determining, by the box merging part, whether X coordinate values of the box comprising the object in the left image and the box comprising the object in the right image are included in an overlap region of the left image and the right image, and when it is determined that the X coordinate values are not included in the overlap region, excluding the boxes comprising the objects from a merging candidate target.

9. The method of claim 8, further comprising performing, by the image splitter, resize processing and normalization processing of the left image and the right image.

10. The method of claim 8, wherein the left image and the right image are at least partially overlapped with each other at a center of the input image.

11. The method of claim 8, further comprising receiving, by the box merging part, a box-related coordinate value of the left image and a box-related coordinate value of the right image, determining whether Y coordinate values of the boxes of the left image and the right image are close within a previously determined reference, and determining the objects of the left image and the right image as different objects when it is determined that the Y coordinate values are not close within the previously determined reference.

12. The method of claim 11, further comprising determining, by the box merging part, whether a center of X coordinate values of the box of the left image and the box of the right image is close within a previously determined reference when it is determined that the Y coordinate values are close within the previously determined reference, and determining the objects of the left image and the right image as the same object when it is determined that the center of the X coordinate values is close within the previously determined reference.

13. The method of claim 11, further comprising determining, the box merging part, whether an object size is smaller than or equal to a previously determined reference when it is determined that the center of the X coordinate values is not close within the previously determined reference, and determining the objects of the left image and the right image as different objects when it is determined that the object size is not greater than or equal to the previously determined reference.

14. The method of claim 13, further comprising determining, by the box merging part, whether the box comprising the object in the left image and the box comprising the object in the right image are close to a cut plane when it is determined that the object size is greater than or equal to the previously determined reference, and determining the objects of the left image and the right image as the same object when it is determined that the two boxes are close to the cut plane.

* * * * *